United States Patent [19]
Drake et al.

[11] Patent Number: 5,244,171
[45] Date of Patent: Sep. 14, 1993

[54] INTERMEDIARY WHEEL SLIP SEQUENCE SPEED PROCESSING SYSTEM FOR MULTIPLE AXLE RAILWAY VEHICLES

[75] Inventors: John W. Drake, Cincinnati, Ohio; James A. Wood, Spartanburg, S.C.

[73] Assignee: Westinghouse Air Brake Company, Wilmerding, Pa.

[21] Appl. No.: 795,358

[22] Filed: Nov. 20, 1991

[51] Int. Cl.⁵ .......................... B61C 15/08; B60T 8/00
[52] U.S. Cl. .......................... 246/168.1; 364/426.02; 303/103; 180/197
[58] Field of Search .......... 246/167 R, 168.1; 364/426.01, 426.02, 426.03, 426.05; 318/52; 180/197; 303/92, 96, 103, 106, 107, 109, 111; 324/161, 166

[56] References Cited

U.S. PATENT DOCUMENTS

| | | | |
|---|---|---|---|
| 3,699,563 | 10/1972 | Cass | 246/168.1 |
| 3,912,034 | 10/1975 | Pallof | 246/168.1 X |
| 4,071,282 | 1/1978 | Callahan et al. | 246/168.1 X |
| 4,164,872 | 8/1979 | Weigl | 318/52 X |
| 4,365,333 | 12/1982 | Mulvey | 246/168.1 X |
| 4,401,035 | 8/1983 | Spigarelli et al. | 105/61 |
| 4,491,920 | 1/1985 | Wood et al. | 303/103 X |
| 4,709,194 | 11/1987 | Yagi et al. | 246/168.1 X |
| 4,740,898 | 4/1988 | McKee et al. | 180/306 X |
| 4,765,430 | 8/1988 | Schulze et al. | 180/197 |
| 4,849,891 | 7/1989 | Krohn et al. | 364/426.01 X |
| 4,941,099 | 7/1990 | Wood et al. | 364/426.02 |

FOREIGN PATENT DOCUMENTS

| | | | |
|---|---|---|---|
| 1000315 | 3/1983 | U.S.S.R. | 246/168.1 |
| 1466967 | 3/1989 | U.S.S.R. | 246/168.1 |

*Primary Examiner*—Michael S. Huppert
*Assistant Examiner*—Scott L. Lowe
*Attorney, Agent, or Firm*—John B. Sotak

[57] ABSTRACT

An interslip sequence slip control system for multiple wheel axle units for railway vehicles including an electronic logic network for determining whether all the axles of the vehicle are slipping at the same time. A first circuit for selecting the maximum axle speed on the vehicle and a second circuit for selecting the minimum axle rate on the vehicle. A converter circuit for increasing the bit size of the maximum axle speed signal. A plurality of calculating circuits for producing a speed reference signal. An interslip sequence circuit for supplying the maximum axle speed signal to a reconversion circuit when at least one axle is not undergoing slippage and for supplying the speed reference signal to the reconversion circuit when all the axles on the vehicle are slipping.

16 Claims, 1 Drawing Sheet

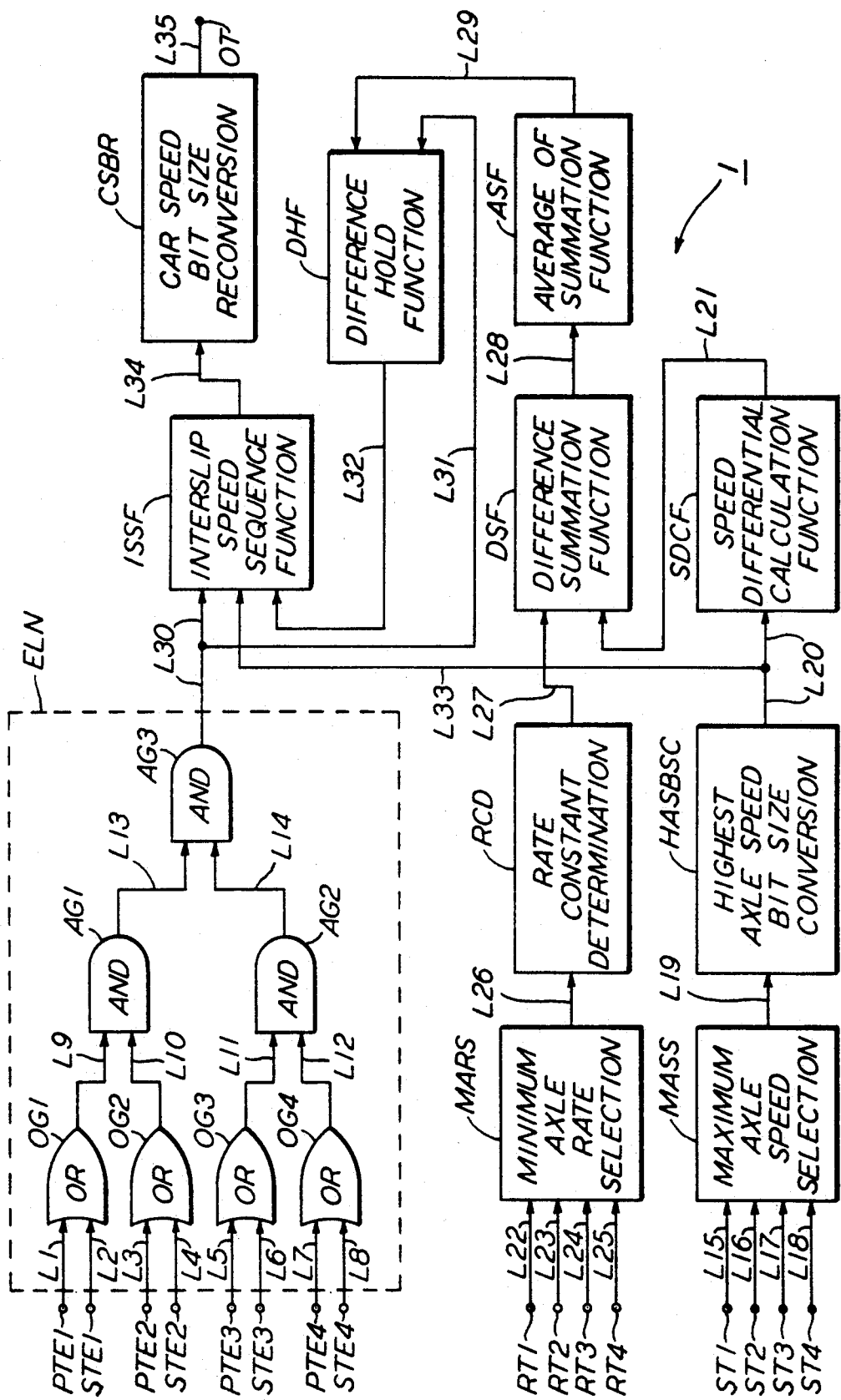

INTERMEDIARY WHEEL SLIP SEQUENCE SPEED PROCESSING SYSTEM FOR MULTIPLE AXLE RAILWAY VEHICLES

FIELD OF THE INVENTION

This invention relates to interslip sequence speed processing arrangement for a railway vehicle having a plurality of wheel axle units, and more particularly to a wheel slip sequence speed control system for multiple axle railway vehicles to supplement an adhesion adaptive wheel slip controller which uses an end of slip sequence speed referencing process to fill in the gaps between the beginning and end of a wheel slip sequence when all the axles of the vehicle are slipping at the same time.

BACKGROUND OF THE INVENTION

It is well known that in certain transportation systems, such as in modern high speed railway and mass and/or rapid transit operations, there is a heed for providing improved wheel slip detection and control apparatus which will more safely and efficiently slow down and/or stop the vehicles or a train at a station, at the entrance of a signal block or the like. A slip condition occurs when more braking force is exerted on the wheel axle unit than that which can be sustained by the available amount of frictional adhesion that exists between the tread of the wheels and the running surface of the rail. A slipping effect causes the wheel axle unit to decelerate at a higher rate than the vehicle deceleration. The primary object of wheel slip control is to reduce the braking force to a point where it is less than the equivalent force of the available adhesion. In practice, such a brake force reduction will attempt to stop the wheel axle unit from decelerating faster than the vehicle and will cause the wheel axle unit to accelerate back up to the speed of the vehicle.

One prior art wheel slip control system is shown and disclosed in U.S. Pat. No. 4,491,920 issued on Jan. 1, 1985, entitled "Rate Polarity Shift Wheel-Slip Control System" which is assigned to the assignee of this invention and which is incorporated by reference to the present application.

Briefly, the wheel-slip control system is for a multiple-truck vehicle including a speed sensor for generating signals representative of the velocity of each of the wheel axle units. A differentiator is connected to each of the speed sensors for differentiating the velocity signals to obtain rate signals. A rate-determining circuit determines the most negative-going rate signal of each of the wheel axle unit of each truck. A plurality of deceleration threshold and rate direction detectors and data processing logic initiate a brake force reduction action on the truck experiencing a wheel slip, and a positive logic "OR" gate senses a polarity shift of the most negative rate signal to cause the data processing logic to reapply a braking action.

Another prior art wheel slip control system is shown and disclosed in U.S. Pat. No. 4,941,099, issued on Jul. 10, 1990, entitled "Electronic Adhesion Adaptive Wheel Slide Arrangement function," which is assigned to the assignee of this invention and which is incorporated by reference to the subject application.

Briefly, the electronic slip control system is for a multiple-truck railway vehicle, including a standard slip control logic circuit which is responsive to axle speed and rate signals to produce a multi-bit binary number word. A primary slip control word formation circuit is used for converting the multi-bit binary number word to a hexidecimal number word which is conveyed to a primary slip control table. The primary slip control table conveys the hexidecimal number word to a table output selection circuit. A synchronous slip control logic circuit is responsive to the axle speed and rate signals to produce a multi-bit binary number word. A synchronous slip control word formation circuit converts the multibit binary number word to a hexidecimal number word which is conveyed to a synchronous slip control table. The synchronous lip control table conveys the hexidecimal number word to the table output selection circuit which causes an intermediate circuit to convey an appropriate control signal to a brake valve for preventing wheel slip.

Each of the above wheel slip control processes is related in the fact that they both use an end of wheel slip sequence speed reference. However, it has been found that during situations in which all of the wheels on a vehicle are experiencing slippage, the utilization of the highest speed wheel on the vehicle for establishing a speed reference is highly unreliable from the standpoint of signal accuracy. It will be appreciated that wheel slip controllers which use an end of wheel slip sequence speed referencing process to control wheel slip effectively conclude each wheel slip correction sequence by causing the slipping wheel to be brought back up to the speed of the vehicle. This form of wheel slip control dramatically improves the accuracy of the speed reference signal which is based on the simple technique of selecting the highest speed wheel on a multiple wheel vehicle. It will be recognized that wheel slip controllers which are specifically designed for providing maximum wheel protection and for minimizing the vehicular stopping distance. It has been found that the usage of the highest speed wheel of the vehicle is a very effective method which produces fairly accurate results. However, this is not the case in which the wheel slip controller is set up to minimize braking force modulations since the controller tends to maximize the sequence time period. Accordingly, this will result in relatively long periods of time to correct all the slipping wheels which have significant levels of slippage.

OBJECTS AND SUMMARY OF THE INVENTION

Accordingly, it is an object of this invention to provide a new and improved wheel slip control system for a multiple axle vehicle.

Another object of this invention is to provide a unique interslip sequence speed processing system which may be used in conjunction with an adhesion adaptive wheel slip controller which employs an end of the slip sequence speed referencing procedure.

A further object of this invention is to provide an intermediate wheel slip sequence speed control system which supplements an adhesion adaptive wheel slip control system for filling in the gaps between the beginning and end of a wheel slip sequence when all of the axles on a vehicle are slipping at the same time.

Still another object of this invention is to provide an interslip sequence speed control algorithm arrangement which may be used in conjunction with a synchronous wheel slip protection system.

Still a further object of this invention is to provide a microprocessor based wheel slip control system which fills in the void between the beginning and end of a synchronous wheel slip sequence control apparatus.

Yet another object of this invention is to provide a wheel slip sequence speed processing system for multiple axle railway vehicles comprising, first means for determining whether all the axles on the vehicle are slipping at the same time, second means for selecting the maximum axle speed value on the vehicle, third means for selecting the minimum acceleration axle rate value on the vehicle, fourth means for converting and increasing the bit size of the highest axle speed value, fifth means for processing the converted bit size highest axle speed value when all the wheels are not slipping and for determining an average deceleration rate to establish a reference axle speed value when all of the wheels are slipping, and sixth means for reconverting the bit size of the highest and reference axle speed values.

Yet a further object of this invention is to provide a wheel slip control system for a multiple axle vehicle comprising, a logic network including a plurality of two-input OR gates in which one input is supplied with primary slip indication signals on a given axle and the other input is supplied with synchronous slip indication signals on the given axle, a pair of two-input AND gates conditioned by said plurality of OR gates and a single two-input AND gate conditioned by said pair of AND gates to determine if all the axles are slipping at the same time, a maximum axle speed selection comparator for selecting the maximum speed value, a highest axle speed converter for increasing the bits of the selected maximum speed value, a speed differential calculator for calculating the difference between the present increased bit speed value and the previous increased bit speed value, a minimum axle rate selection comparator for selecting the minimum axle rate, a rate constant determination circuit for selecting a constant value in response to the minimum axle rate, a difference summation circuit for summing each speed difference calculation over a given period of time and for subtracting the minimum axle rate constant value from the summation of the speed difference calculations, an average speed summation circuit for dividing the speed difference summation value by a given number of time periods, a difference hold circuit for holding the average speed difference value at the beginning of a sequence in which all the axles are slipping, an interslip speed sequence circuit for determining the increased bit speed value when at least one axle is not slipping and for determining a speed reference value by subtracting the average speed difference from the previous calculated speed reference value, and a vehicle speed reconverter for reducing the bits of the output received from interslip speed sequence circuit.

DESCRIPTION OF THE DRAWING

The foregoing objects and other attendant features and advantages of the subject invention will be more readily understood from the following detailed description when considered in conjunction with the accompanying drawing wherein:

The single Figure is a schematic circuit block diagram of an intermediate wheel slip sequence speed control system for a multiple axle railway vehicle in accordance with the present invention.

DETAILED DESCRIPTION OF THE INVENTION

Referring now to the single Figure of the drawing, there is shown an interslip sequence speed processing arrangement which employs a binary mathematical method for determining with reasonably accurate speed a reference signal when any of the wheels on a multiple axle vehicle are slipping. Normally, a mass and/or rapid transit car is a two-truck, four-axle railway vehicle.

The speed of each of the four wheel axle units is sensed and measured by a separate associated magnetic pickup device or sensor which may take the form of a conventional tachometer generator. Each of the tachometer generators is disposed in close proximity to a toothed wheel which is driven by each of the four wheel axle units. Thus, the magnetic generator senses the speed of the passing teeth of the driven gears to produce electrical signals or pulses which have a frequency proportional to the angular rotation of the respective gears. That is, the tachometer generators produce alternating current signals having a frequency which varies with the rotating speed or velocity of the respective wheel axle units. It will be appreciated that the output signal of each of the four magnetic pickup devices or sensors is connected to the input of a respective one of four suitable velocity measuring circuits. Each of the velocity measuring circuits is basically a converter which includes a pulse shaper, counters and buffer latches. It will be appreciated that the a.c. signals are fed to the pulse shaper which produces constant-amplitude square-wave pulses which have a repetition rate proportional to the input frequency. Next, the square-wave pulses are fed to a gating circuit which allows a high frequency clock input to the counters to produce an output which is inversely proportional to the frequency of the particular wheel axle unit being monitored. Then, the velocity count signals are fed to buffer latches which provide the necessary stabilization and isolation. It will be understood that the outputs of each of the speed or velocity measuring circuits are connected to the inputs of a respective differentiating circuit which operates in a well known manner to perform a time derivation for obtaining a rate signal having one polarity when the vehicle is decelerating and having the opposite polarity when the vehicle is accelerating.

As shown, the interslip sequence speed control system generally characterized by numeral 1 includes an electronic logic network ELN. The logic network includes a plurality of two-input OR gate circuits OG1, OG2, OG3, and OG4 as well as a plurality of two-input AND gate circuits AG1, AG2, and AG3.

The one input of the first two-input OR gate OG1 of the first stage of network ELN is connected to input terminal PTE1 via lead L1 while the other input of the OR gate OG1 is connected to input terminal STE1 via lead L2. It will be appreciated that the logical input signal appearing on terminal PTE1 is derived from a primary table enable/disable circuit PTE while the logical input signal appearing on terminal STE1 is derived from a synchronous table enable/disable circuit STE both of which are shown and described in detail in the above-noted U.S. Pat. No. 4,941,099. The function of the OR gate OG1 is to determine if slippage is occurring on No. 1 axle of the vehicle. The ensuing wheel slippage can be the result of either a perceptible primary wheel slip condition or a subtle synchronous slip condition. As noted above, the OR gate OG1 is functionally responsive to the input signals received from the primary and synchronous slip indicators from the No. 1 axle. If the input signal developed on either terminal PTE1 or terminal STE1 is a high or a logical "1" which indicates that either the primary slip indicator or the synchronous slip indicator for the No. 1 axle is being actively controlled, then the output of the OR gate OG1 will be a high or logical "1". If neither of the two wheel slip conditions is present, namely, if neither input is a logical "1", then the output of the OR gate OG1 will be a low or logical "0".

It will be noted that one input of the second two-input OR gate OG2 of the first stage of logic network ELN is connected to input terminal PTE2 via lead L3 while the other input of the two-input OR gate OG2 is connected to input terminal STE2 via lead L4. Like input terminal PTE1, the logical input signal appearing on terminal PTE1 is a function of the perceptible primary wheel slip condition of the No. 2 axle on the vehicle while the logical input signal appearing on the terminal STE2 is a function of the subtle synchronous wheel slip condition of the No. 2 axle on the vehicle. If the input signal developed on either terminal PTE2 or terminal STE2 is a high or a logical "1" which signifies that either the primary slip indicator or the synchronous slip indicator for the No. 2 axle is being effectively controlled, then the OR gate OG2 will output a high or a logical "1". If neither of the wheel slip conditions is present, the OR gate OG2 will output a low or a logical "0".

It will be seen that one input of the third two-input OR gate OG3 is connected to input terminal PTE3 via lead L5 while the other input of the OR gate OG3 is connected to the input terminal STE3 via lead L6. The logical input signal appearing on terminal PTE3 is dependent upon the discernible primary wheel slip condition of the No. 3 axle of the vehicle while the logical input signal existing on the terminal STE3 is a function of the subtle synchronous wheel slip condition of the No. 3 axle on the vehicle. If the input signal on terminal PTE3 is a high or a logical "1" which indicates that the primary slip indication is being effectively controlled, then the OR gate OG3 will output a high or a logical "1". Alternatively, if the input signal on terminal STE3 is a high or a logical "1", which signifies that the synchronous slip indicator is being actively controlled, then the OR gate OG3 will also output a high or a logical "1". If neither of the indicators signify a wheel slip condition, the OR gate OG3 will produce a low or a logical "0".

It will be observed that one input of the fourth two-input OR gate OG4 is connected to input terminal PTE4 via lead L7 while the other input of the OR gate circuit OG4 is connected to the input terminal STE4 via lead L8. The logical input signal developed on terminal PTE4 is a function of the perceptible primary wheel slip condition of the No. 4 axle on the vehicle while the logical input signal appearing on the terminal STE4 is a function of the synchronous wheel slip condition of the No. 4 axle on the vehicle. If the input signal appearing on either terminal PTE4 or terminal STE4 is a high or a logical "1" which indicates that either the primary slip indicator or the synchronous slip indicated for the the No. 4 axle is being actively controlled, then the output of OR gate OG4 will generate a high or logical "1". On the other hand, if neither slip condition on No. 4 axle is present, then the OR gate OG4 will output a low or a logical "0".

The second stage of the electronic logic network ELN includes the pair of two-input AND gate circuits AG1 and AG2. The function of the AND gate AG1 is to determine if the No. 1 axle and No. 2 axle are both actively handling a slippage situation. As shown, one input of AND gate AG1 is connected to the output of the OR gate OG1 via lead L9 while the other input of the AND gate AG1 is connected to the output of OR gate OG2 via lead L10. The output of the AND gate AG1 will be a high or logical "1" when and only when both OR gates OG1 and OG2 supply a high or logical "1" to the two inputs. Otherwise, the output of AND gate AG1 will be a low or logical "0". As shown, the AND gate AG2 functions to determine if the No. 3 axle and the No. 4 axle are both actively handling a slippage situation. It will be noted that one input of AND gate AG2 is connected to the output of OR gate OG3 via lead L11 while the other input of AND gate AG2 is connected to the output of OR gate OG2 via lead L12. The output of the AND gate AG2 will be a high or a logical "1" when and only when both OR gates OG3 and OG4 supply a high or a logical "1" to both inputs; otherwise, the output of the AND gate AG2 will be a low or a logical "0".

It will be seen that the third stage of the electronic logic network ELN includes a single two-input AND gate AG3. The function of the AND gate circuit AG3 is to determine if all four (4) axles on the vehicle are actively handling a slippage situation. As shown, one input of AND gate AG3 is connected to the output of the AND gate AG1 via lead L13 while the other input of the AND gate AG3 is connected to the output of the AND gate AG2 via lead L14. The output of the AND gate AG3 will be a high or a logical "1" when and only when the AND gates AG1 and AG2 supply a high or a logical "1" to the two inputs; otherwise, the output of the AND gate AG3 will be a low or a logical "0".

It will be appreciated that the outputs of the four (4) speed or velocity measuring circuits are connected to the respective input terminals ST1, ST2, ST3, and ST4 of a maximum axle speed selection circuit MASS via leads L15, L16, L17, and L18, respectively. The maximum axle speed selection circuit MASS compares the four (4) speeds of the wheel axle units and performs a selection function to determine which of the four (4) speeds has the highest amplitude. The selected speed signal appears at the output of the speed selection comparison circuit MASS and is conveyed to the input of a highest axle speed bit size conversion circuit HASBSC via lead L19. The function of the highest axle speed but size converter HASBSC is to convert the eight (8) binary speed value derived from the highest axle speed signal to a sixteen (16) binary value. As shown, the highest axle speed bit size converter HASBSC receives its sole input from the maximum axle speed selector MASS. The 8-bit binary input value is simply shifted eight (8) times to the left to produce the 16-bit binary speed value. In practice, this conversion function may be accomplished by connecting the 8-bit input lines emanating from the maximum axle speed selection circuit MASS to the 8 high order bits while holding the 8 low order bits at the logical "0" input level.

It will be seen that the output of the highest axle speed bit size converter HASBSC is connected to the input of a speed differential calculation function circuit SDCF via lead L20. The function of the speed calculator SDCF is to calculate the difference 16-bit speed signal that is occurring during the present time period which is set at a twenty (20) millisecond interval and the 16-bit speed signal that occurred during the previous time period. For example, the binary input signal received from the highest axle speed bit size converter HASBSC at the present time is subtracted from the previous binary input signal received from the highest axle speed bit size converter HASBSC. If the calculated signal value is greater than or equal to zero (0), this is used as the output of the speed differential calculation function circuit SDCF. Conversely, if the calculated signal value is less than zero (0), then the output of the speed differential calculation function circuit SDCF will be zero (0). It will be seen that the output of the speed differential calculation function circuit SDCF is connected by lead L21 to one input of a difference summation function circuit DSF which will be described in greater detail hereinafter.

It will be appreciated that the outputs of the four (4) differentiating circuits are connected to the respective input terminals RT1, RT2, RT3, and RT4 of a minimum axle rate selection circuit MARS via L22, L23, L24, and L25, respectively. The axle rate selection circuit MARS compares the four (4) axle rate input signals and produces an output signal which is equal to minimum axle rate. The minimum axle rate selection circuit MARS takes into consideration both acceleration and deceleration rates. The selected axle rate signal is conveyed to the input of a rate constant determination circuit RCD via lead L26. The function of the rate constant determination circuit RCD is responsible for the selection of a constant which is used to modify the slippage deceleration value. It will be observed that as the input value from the maximum axle rate decreases, the constant value will increase. The following table gives the input to output relationship for the rate constant determination function.

| INPUT (MARS)      | OUTPUT |
|-------------------|--------|
| > −3.2 MPHPS      | 0      |
| −3.2 to −10 MPHPS | 96     |
| < −10 to −18 MPHPS| 128    |
| < −18 MPHPS       | 384    |

The output of the rate constant determination circuit RCD is connected to the other input of the difference summation function circuit DSF via lead L27. The function of the difference summation circuit DSF is responsible for the summation of each speed difference calculation over the last thirty-two (32) time periods. The time period is set at a twenty millisecond (20 ms) interval. In addition, the function of the difference summation circuit DSF is also responsible for subtracting the axle rate generated constant from summation of the speed difference calculations. After the summation is compiled, the output value of the rate constant determination circuit RCD is subtracted to form the difference summation function. The output of the difference summation function circuit is determined by the following three (3) conditions:

1. If the sum of the difference summation function circuit DSF is greater than 1280, the output will be equal to 1280.
2. If the sum of the difference summation function circuit DSF is less than or equal to 1280 and is greater than or equal to 256, the output will be equal to the calculated value of the difference summation function circuit DSF.
3. If the sum of the difference summation function circuit DSF is less than 256, the output will be equal to 256.

As shown, the output of the difference summation function circuit DSF is connected to the input of an average of summation function circuit ASF via lead L28. The function of the average of summation function circuit ASF is responsible for dividing the modified speed difference summation value by the number of time periods required to form the modified speed difference summation. The input to the average of summation function circuit ASF is divided by thirty-two (32) by the average of summation function circuit ASF. The division can be performed either by an actual dividing process or by five (5) binary shifts to the right.

It will be seen that the output of the average of summation function circuit ASF is connected to one input of a difference hold function circuit DHF via lead L29. The function of the difference hold function circuit is responsible for holding the modified average speed difference value which is calculated at the beginning of a sequence when all the axles are slipping until the time when at least one of the axles stops slipping. In practice, the operation of the difference hold function circuit DHF is a set/reset type of function. The set/reset condition is controlled by the AND gate AG3 which is connected to the other input of the difference hold function circuit DHF via leads L30 and L31. If the AND gate AG3 undergoes a transition from a logical "0" to a logical "1", the output of the difference hold function circuit, DHF will be set to a value which is equal to the input signal received from the average of summation function circuit ASF. This output value will be maintained until the AND gate AG3 undergoes a transition from a logical "1" to a logical "0". This logical input change will cause the difference hold function circuit to be reset. The reset condition causes the output of the difference hold function circuit DHF to become equal to the input signal for each time period.

As shown, the output of the difference hold function circuit DHF is connected to a first input of an interslip speed sequence function circuit ISSF via lead L32. It will be seen that the output of the AND gate AG3 is directly connected to a second input of the interslip speed sequence function circuit ISSF via lead L30 while the output of the highest axle speed bit size conversion circuit HASBSC is connected to the third input of the interslip speed sequence function circuit ISSF via leads L20 and L33. The function of interslip speed sequence function circuit ISSF is responsible for establishing the sixteen (16) bit speed reference signal. During the times when at least one axle is not undergoing a slipping condition, the highest axle speed value which is converted to the 16-bit speed value is utilized. However, if all of the axles are undergoing slippage, the speed reference is calculated by subtracting the modified average speed difference value from the previous speed reference value. Thus, if the input signal from AND gate AG3 of the electronic logic network ELN on lead L30 is a logical "0", the output on lead L34 of the interslip speed sequence function circuit ISSF will be equal to the input received from the highest axle speed bit size conversion circuit HASBSC. Now if the input from AND gate AG3 on lead L30 is a logical "1", the output on lead L34 will be equal to the previous output of the interslip speed sequence function circuit ISSF minus the present input value received from the difference hold function circuit DHF.

It will be seen that the output of the interslip speed sequence function circuit ISSF is conveyed by the lead L34 to the input of a car speed bit size reconversion circuit CSBSR. The car speed bit size reconversion circuit CSBSR is responsible for converting the sixteen (16) bit speed reference value received from the interslip speed sequence function circuit ISSF back to an eight (8) bit speed value which is conveyed to output terminal TO via lead L35. It will be appreciated that the 16-bit input signal is shifted eight (8) places to the right which results in an 8-bit output signal. In practice, this reconversion function may be accomplished by connecting the high order eight (8) bits from the sixteen (16) bits of the interslip speed sequence function circuit ISSF to the 8-bit input of the car speed bit size reconversion circuit CSBSR.

Thus, it will be seen that the present system initially converts an 8-bit interface input number to an intermediate 16-bit number for calculation purposes and then reconverts the 16-bit intermediate number to an 8-bit output number when used with 8-bit wheel slip control arrangements. It will be recognized that the use of 16-bit mathematical calculations results in increased reference speed accuracy. In operation, the system employs a simple highest axle speed signal developed on the vehicle when at least one wheel axle unit is not experiencing a wheel slip condition. Such an operational procedure is made possible due to the fact that the proposed system is used in conjunction with a wheel slip controller which utilizes an end of wheel slip sequence speed referencing process to effectively control the wheel slippage. This distinctly has the advantage that the updating of the speed referencing signal can be effectively achieved with accurate data which does not have to be calculated. Alternatively, when all the wheel axle units are slipping, the present system employs the time period just before the occurrence of when all the axles begin slipping to determine the average deceleration. Under such a procedure, the previous deceleration value is used to provide a baseline for calculating the speed reference signal during the period of time in which all the wheel axle units are slipping. Such an approach results in relatively accurate performance since the present system is combined with wheel slip controllers which employ an end of wheel slip speed referencing process to control wheel slip. In order to further enhance the exactness of the present approach when all the wheels on the vehicle are slipping, the average deceleration rate value is modified by the minimum wheel axle deceleration rate on the vehicle at the point where all of the axles begin to slip. This provides the essential information on the amount of variation in the adhesion occurring between the average deceleration which is the product of historical data and the minimum wheel axle deceleration rate at the time when all the wheel axle units are slipping which is derived from the present data. Accordingly, the system employs a simple binary mathematical procedure directed at reducing the processing time as well as decreasing either the number of hardware components or the complexity of the memory software. In interface control operations, the present interslip sequence speed control system is capable of providing the following advantages:

First, it reduces the errors in speedometer operations due to wheel slip; second, it reduces the errors in odometer operations due to seasonal poor adhesion condition, and third, it improves the ability of the wheel slip controller in preventing the cascading of wheel slides.

Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly set forth in what is claimed. It will be understood that various alterations and changes may be made by those skilled in the art without departing from the spirit and scope of the subject invention. Further, with the advent of microprocessors and minicomputers, it is evident that the various functions and operations may be carried out and processed by a suitably programmed computer which receives the different inputs and produces the appropriate output. Therefore, it will be appreciated that certain modifications, ramifications, and equivalents will be readily apparent to persons skilled in the art, and accordingly it is understood that the present invention should not be limited to the exact embodiment shown and described, but should be accorded the full scope and protection of the appended claims.

We claim:

1. A wheel slip sequence speed processing system for multiple axle railway vehicles comprising, first means for determining whether all the axles on the vehicle are slipping at the same time, second means for selecting the maximum axle speed value on the vehicle, third means for selecting the minimum acceleration axle rate value on the vehicle, fourth means for converting and increasing the bit size of the highest axle speed value, fifth means for processing the converted bit size highest axle speed value when all the axles are not slipping and for determining an average deceleration rate to establish a reference axle speed value when all of the axles are slipping, and sixth means for reconverting the bit size of the highest and reference axle speed values.

2. The wheel slip sequence speed processing system for multiple axle railway vehicles as defined in claim 1, wherein said fourth means converts an 8-bit number to a 16-bit number.

3. The wheel slip sequence speed processing system for multiple axle railway vehicles as defined in claim 2 wherein said sixth means reconverts the 16-bit number to an 8-bit number.

4. The wheel slip sequence speed processing system for multiple axle railway vehicles as defined in claim 1, wherein said first means is a logic network.

5. The wheel slip sequence speed processing system for multiple axle railway vehicles as defined in claim 4, wherein said logic network includes a plurality of OR gate circuits.

6. The wheel slip sequence speed processing system for multiple axle railway vehicles as defined in claim 5, wherein each of said plurality of OR gate circuits includes two inputs.

7. The wheel slip sequence speed processing system for multiple railway vehicles as defined in claim 4, wherein said logic network includes a plurality of AND gate circuits.

8. The wheel slip sequence sped processing system for multiple axle railway vehicles as defined in claim 7, wherein each of said plurality of AND gate circuits includes two inputs.

9. The wheel slip sequence speed processing system for multiple axle railway vehicles as defined in claim 4, wherein said logic network includes a plurality of stages.

10. The wheel slip sequence speed processing system for multiple axle railway vehicles as defined in claim 9, wherein a second stage of said plurality of stages includes a pair of AND gates.

11. The wheel slip sequence speed processing system for multiple axle railway vehicles as defined in claim 9, wherein a third stage of said plurality of stages includes an AND gate.

12. The wheel slip sequence speed processing system for multiple axle railway vehicles as defined in claim 9, wherein a first stage of said plurality of stages includes four OR gates.

13. The wheel slip sequence slip processing system for multiple axle railway vehicles as defined in claim 12, wherein each of said four OR gates includes one input connected to a primary wheel slip condition terminal of one of four wheels of the railway vehicle and includes another input connected to a synchronous wheel slip condition terminal of said one of the four wheels of the railway vehicle.

14. The wheel slip sequence speed processing system for multiple axle railway vehicles as defined in claim 12, wherein the outputs of a first pair of said four OR gates are connected to the inputs of a first two-input AND gate and the output of a second pair of said OR gates are connected to the inputs of a second two-input AND gate.

15. The wheel slip sequence speed processing system for multiple axle railway vehicles as defined in claim 14, wherein the outputs of said first and said second two-input AND gates are connected to the respective inputs of a two-input AND gate.

16. A wheel slip control system for a multiple-axle vehicle comprising, a logic network including a plurality of two (2) input OR gates in which one input is supplied with primary slip indication signals on a given axle and the other input is supplied with synchronous slip indication signals on the given axle, a pair of two-input AND gates conditioned by said plurality of OR gates and a single two-input AND gate conditioned by said pair of AND gates to determine if all the axles are slipping at the same time, a maximum axle speed selection comparator for selecting the maximum speed value, a highest axle speed converter for increasing the bits of the selected maximum speed value, a speed differential calculator for calculating the difference between the present increased bit speed value and the previous increased bit speed value, a minimum axle rate selection comparator for selecting the minimum axle rate, a rate constant determination circuit for selecting a constant value in response to the minimum axle rate, a difference summation circuit for summing each speed difference calculation over a given period of time and for subtracting the minimum axle rate constant value from the summation of the speed difference calculation, an average speed summation circuit for dividing the speed difference summation value by a given number of time periods, a difference hold circuit for holding the average speed difference value at the beginning of a sequence in which all the axles are slipping, an interslip speed sequence circuit for determining the increased bit speed value when at least one axle is not slipping and for determining a speed reference value by subtracting the average speed difference from the previous calculated speed reference value, and a vehicle speed reconverter for reducing the bits of the output received from interslip speed sequence circuit.

* * * * *